March 15, 1949.  W. B. MacKENZIE  2,464,455
ELECTRICAL INSULATION
Filed Jan. 25, 1946
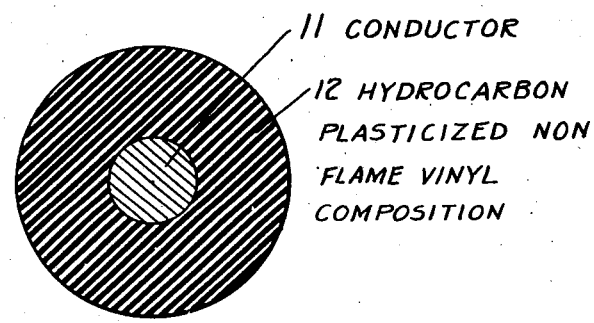
11 CONDUCTOR
12 HYDROCARBON PLASTICIZED NON FLAME VINYL COMPOSITION
INVENTOR
WALLACE BENTLEY MACKENZIE
BY
ATTORNEY Patented Mar. 15, 1949

2,464,455

UNITED STATES PATENT OFFICE 2,464,455

ELECTRICAL INSULATION

Wallace Bentley MacKenzie, Yonkers, N. Y., assignor to Phelps Dodge Copper Products Corporation, Dover, Del., a corporation of Delaware Application January 25, 1946, Serial No. 643,346

1 Claim. (Cl. 260—31.8)

The present invention relates to electrical insulation and more particularly to electrical conductors insulated therewith. The invention is directed to improved electrical insulation compositions comprising plasticized purified products of polymerization processes applied to vinyl halides and mixtures of vinyl halides with minor proportions of other polymerizable materials in which the polymerizable group is ($CH_2=CH$) and to improved electrical cables embodying such compositions as insulations.

The principal object of the invention is to produce an electrical insulation composition containing plasticized non-flame-supporting polymers and copolymers of vinylic compounds which exhibit low dielectric losses, low power factor, and high insulation resistance particularly and desirably so at elevated temperatures.

The foregoing and other features of my invention will now be described in connection with the accompanying drawing forming part of this specification in which I have illustrated my electrical insulation as it may be applied to a high tension electrical conductor, after which I shall point out in the claim those features which I believe to be new and of my own invention.

In the drawing the single figure is a cross section of a conductor 11 having my insulation 12 applied thereon.

Polymerized vinyl halides, for example, polymerized vinyl chloride, may be plasticized with various substances, for instance tricresyl phosphate, to produce a composition which has some physical properties similar to rubber but is not as susceptible to chemical attack as is rubber by oxygen or mineral oils.

Such compositions are electrically poor in character, since they exhibit high power factor, particularly at elevated temperatures. This is so pronounced that I have found these compositions to be unsuitable for insulation at voltage above 600 volts alternating current. Higher voltage cable insulated with such compositions show high dielectric losses which increase with increase in temperature and voltage.

Investigation of the compositions in question namely those disclosed in Semon 1,929,453; those disclosed in M. M. Safford Patent 2,118,017; those disclosed in Safford 2,231,595; those disclosed in Safford 2,269,990 has led to the important discovery that substantial improvements in their usefulness for not only high voltage insulation but also for direct current insulation are attained by incorporating specific plasticizers with the polymerized vinyl resin and stabilizing ingredients other than those heretofore disclosed. By following a specific order of procedure in compounding the ingredients an insulation is obtained which exhibits a low power factor not only over a range of temperatures (−40 to +80° C.)—the range of usefulness—also further which possesses a high direct current insulation resistance comparable to that of high grade natural rubber insulations for the temperature range.

In accordance with the disclosure of the aforementioned Semon 1,929,453 patent, polymerized vinyl resin or resins are dissolved in a substantially non-volatile composition which will dissolve them at an elevated temperature, and after solution the mixture is cooled to room temperature forming a rubber-like gel.

As disclosed in Safford 2,118,017, one procedure for insulating a conductor with the compositions in question is to thoroughly compound the polymerized vinyl resin or resins, plasticizers, fillers, stabilizers etc. between differential rolls which may be heated. The material is then sheeted after proper compounding and may be applied to a bare or previously insulated conductor by means of an extrusion machine or a strip covering machine.

The compositions of Semon, 1,929,453; Safford 2,118,017; Fuoss 2,171,334, Safford 2,231,595; and Safford 2,269,990 that are plasticized and in some cases stabilized polymerized vinyl resins form good coverings or sheaths for conductors since they possess good mechanical properties, such as toughness and resistance to abrasion. However, because they exhibit high dielectric losses which change considerably with change in temperature, being low at some temperatures and high at others, said changes being related to temperature changes in a way which is characteristic only for a specific composition. They are not being used for high voltage alternating current insulation nor can they be used successfully for direct current insulation over the range of −40 to +80° C. An idea of the magnitude of the alternating current dielectric losses and direct current resistance of the best compositions disclosed in patents listed in this paragraph can be obtained by considering the data in the following table:

Examination of a series of twenty-nine aromatic products produced from petroleum as basic

Table

| Composition | | | | Temperature | | | | | | | |
|---|---|---|---|---|---|---|---|---|---|---|---|
| | | | | −40 | | 0 | | 40 | | 80 | |
| Source U. S. | Resin | Plast. | Filler | L. F. | R | L. F. | R | L. F. | R | L. F. | R |
| 2,118,017 | 60 PVC | 40 TCP | | 0.021 | ∞ | 0.370 | 5,950 | 1.092 | 1.57 | 44.1 | .017 |
| 2,118,017 | 52 PVC | 38 TCP | Pbo-5, Dixie, Spec. 102-5 | 0.037 | ∞ | 0.446 | 8,950 | 0.843 | 7.15 | 6.0 | .089 |
| 2,171,334 | 60 PVC | 40 TCP | Pbo.2.5, PbRe 2.5, Fuller's Earth | 0.029 | ∞ | 0.467 | 22,700 | 0.735 | 50.0 | 2.1 | .39 |
| 2,231,595 | 54.5 PVC | 40 TCP | PbPh 2.5, C.B. 3.0 | 0.026 | ∞ | 0.586 | 3,040 | 0.718 | 2.52 | 13.70 | .061 |
| 2,269,990 | 56.4 PVC | 37.6 TCP | Pbo 6 | 0.038 | ∞ | 0.438 | 8,910 | 0.851 | 7.6 | 10.0 | .094 |

Where
 PVC = polymerized vinyl chloride
 TCP = tricresyl phosphate
 LF = loss factor measured at 60 cycles
 R = resistance
 ∞ = infinity
 Pbo = lead monoxide
 Dixie Spec. 102 = carbon black
 PbRe = lead resinate
 PbPh = lead phenate Thus it is apparent that the foregoing patents fall far short of solving the problem of providing insulations useful to replace rubber in the range −40 to +80° C.

A review of the properties of the components indicates the undesirable features originate in the tricresyl phosphate, a fact accepted and realized by many skilled in the art who, by various esters and other readily saponifiable materials obviously having plasticizing power for polymeric vinyl resins, have sought to improve the electrical properties of the above compositions and of those thereto similar.

Such effort has resulted in slight improvements and as typical and in most general use is the replacment of a large proportion or even all of the tricresyl phosphate by di 2-ethyl hexyl phthalate.

The results of such replacement while encouraging do not attain the desired freedom of the electrical properties from the effects of temperature. Further the use of plasticizers which are saponifiable detracts very considerably from the value of such compositions as insulation for use in alkaline locations. Frequently too, such substitutes for tricresyl phosphate are more expensive and affect adversely the self-extinguishing properties of composition when ignited.

A diligent search for a plasticizer for polymeric vinyl resins having the following traits: 1. High compatibility with vinyl resins; 2. Low content of saponifiable; 3. Low volatility; 4. Low coloring power; 5. High resistance to oxidation; 6. Excellent electrical properties; 7. Low in cost, has resulted in the unexpected and very valuable discovery that certain hydrocarbon derivatives of petroleum possess the required and long sought properties.

The search was conducted by evaluating the materials as plasticizer in the following recipe:

| | |
|---|---|
| Polyvinyl chloride | 45–0 |
| Dioctyl phthalate | 9–0 |
| Material under test | 28–0 |
| Mineral stabilizer | 2–0 |
| Mineral filler | 13–8 |
| Carbon black | 0–8 |
| Naphthenic oil lubricant | 2–0 |

The compounding was conducted according to the teachings of Safford in Patent No. 2,118,017.

Examination of a series of twenty-nine aromatic products produced from petroleum as basic raw material resulted in the discovery that hydrocarbons satisfactory for use as principal plasticizers are those condensation products obtained by reacting an aromatic petroleum fraction with formaldehyde using such catalysts as hydrogen fluoride, the usual catalyst for the "formolite" reaction or activated clays. The aromatic petroleum stock is one having an A. S. T. M. boiling point range of about 400 to about 500° F., and containing about 30 to about 65% aromatic hydrocarbons. Such aromatic petroleum stocks may be obtained from 1- or 2-pass catalytic bottoms. The aromatic hydrocarbons present in this aromatic petroleum stock include tetramethyl benzenes, naphthalenes, methyl naphthalenes and di-methyl naphthalenes. The naphthalenes are the dominant components.

The condensation product obtained from aromatic petroleum stock having a boiling range from about 400 to about 500° F., contains

$CH_3.C_{10}H_6—CH_2—C_{10}H_6.CH_3$ and

$(CH_3)_2.C_{10}H_5—CH_2—C_{10}H_5.(CH_3)_2$ and corresponding polymers and has the following characteristics:

| | |
|---|---|
| Specific gravity 60/60° F | 1.0359–1.0544 |
| Flash (COC) °F | 355–425 |
| Fire °F | 415–510 |
| Drop melting point °F | 80–124 |
| Mixed aniline point °F | 71.5–81.3 |
| Viscosity @ 130° F. S. U. S | 27,200–39,000 |
| Viscosity @ 210° F. S. U. S | 109–348 |

Non-flame supporting vinyl polymers have heretofore been plasticized with materials which are saponifiable, both saponifiable and polar, or polar in character. Consequently I was surprised to find materials existed which were substantially non-polar and non-saponifiable yet valuable plasticizers for non-flame supporting vinyl resins. Specifically I have found Socony Vacuum Oil Co.'s hydrocarbon product of condensation reaction to be suitable plasticizer in conjunction with fillers as later specifically disclosed for providing a non-rigid non-flame supporting vinyl composition suited for use as electrical insulation over the range −40° C. to +80° C.

As examples of the uses of hydrocarbon product of condensation reaction the following are tabulated recipes:

|  | 1 | 2 | 3 | 4 | 5 |
|---|---|---|---|---|---|
| Poly Vinyl Chloride | 60 | 52 | 60 | 54.5 | 56.4 |
| Hydrocarbon product of condensation reaction | 40 | 38 | 40 | 40.0 | 37.6 |
| Lead Oxide |  | 5 | 2.5 |  | 6.0 |
| Dixie Special 102 |  | 5 |  |  |  |
| Lead Resinate |  |  | 2.5 |  |  |
| Fuller's Earth |  |  | 5.0 |  |  |
| Lead Phenate |  |  |  | 2.5 |  |
| Carbon Black |  |  |  | 3.0 |  |

While these in general illustrate the electrical superiority of hydrocarbon product of condensation reaction over the tricresyl phosphate they do not represent the preferred composition which is illustrated later but only serve to provide a direct comparison of hydrocarbon product of condensation reaction with tricresyl phosphate in compositions typical of best practice as disclosed in patents aforementioned.

The following table shows, illustratively, the improvement in electrical properties over the range −40° C. to +80° C. of compositions containing hydrocarbon product of condensation reaction in accordance with my discovery and similar compositions from the following patents made with tricresyl phosphate: Semon, 1,929,453; Safford, 2,118,017; Fuoss, 2,171,334; Safford, 2,231,595, and Safford, 2,269,990.

Table

| Composition | Temperature | | | | | | | |
|---|---|---|---|---|---|---|---|---|
|  | −40 | | 0 | | 40 | | 80 | |
|  | L. F. | R | L. F. | R | L. F. | R | L. F. | R |
| Semon 1,929,453 #1 | .021 | ∞ | .370 | 5,950 | 1.092 | 1.57 | 44.1 | .017 |
|  | .012 | ∞ | .014 | ∞ | .016 | ∞ | .593 | 580.0 |
| Safford 2,118,017 #2 | .037 | ∞ | .446 | 8,950 | .843 | 7.15 | 6.0 | .089 |
|  | .023 | ∞ | .065 | ∞ | .079 | 42,500 | .518 | 1,700.0 |
| Fuoss 2,171,334 #3 | .029 | ∞ | .467 | 22,700 | .735 | 50.0 | 2.12 | .39 |
| Safford 2,231,595 #4 | .026 | ∞ | .586 | 3,040 | .718 | 2.52 | 13.7 | .061 |
| Safford 2,269,990 #5 | .038 | ∞ | .438 | 8,910 | .851 | 7.6 | 10.0 | .094 |

The preferred compositions of this invention are those having greater flexibility at low temperatures and involve the use of a minor proportion of an ester or amide type plasticizer, said minor proportion of plasticizer for low temperature to be that class of plasticizer disclosed and claimed by T. L. Gresham in U. S. Patent 2,325,951 granted August 3, 1943, of which di 2 ethyl hexyl phthalate is chosen as illustrative of their value.

The following table illustratively presents the influence of replacing minor proportions of hydrocarbon product of condensation reaction by di 2 ethyl hexyl phthalate (D. O. P.)—(purified to a per cent P. F. at 60 c. p. s. and 25° C. of less than 2%) and reveals the range of compositions most widely applicable.

The base recipe used in the composition is

Polyvinyl chloride _____ 45–0
Plasticizer _____ 37–0
Basic lead carbonate _____ 15–8
Carbon black _____ 0–8
Naphthenic oil lubricant _____ 2–0

| Plasticizer Composition | | Temperature | | | | | | | |
|---|---|---|---|---|---|---|---|---|---|
| Hydrocarbon product of condensation reaction | D. O. P. | −40 | | 0 | | 40 | | 80 | |
|  |  | L. F. | R | L. F. | R | L. F. | R | L. F. | R |
| 37 | 0 | ----- | -- | ----- | ----- | ----- | ----- | ----- | ----- |
| 32 | 5 | ----- | -- | ----- | ----- | ----- | ----- | ----- | ----- |
| 28 | 9 | .031 | ∞ | .072 | ∞ | .500 | 3,350 | .301 | 10.2 |
| 24 | 13 | .037 | ∞ | .162 | ∞ | .506 | 807 | .314 | 5.1 |
| 20 | 17 | .025 | ∞ | .264 | 45,600 | .494 | 227 | .517 | 2.4 |
| 16 | 21 | .040 | ∞ | .379 | 44,700 | .510 | 154 | .605 | 2.1 |

From the foregoing it will be evident that the electrical properties of plasticized non-flame-supporting vinyl polymers have been materially improved by means of my discovery. The composition of my invention is especially adaptable for insulating either alternating current or direct current power transmitting cables operating over the temperature range −40° C. to +80° C. and at higher voltages. My improved compositions may be used in conjunction with other insulation such as paper, asbestos, varnished cambric, rubber, cellulose acetate, poly hydrocarbons, poly chlorohydrocarbons, glass, polytetrafluoroethylene, etc.

The naphthenic oil lubricant which I find satisfactory has the following characteristics:

1. Its use shall not degrade the electrical properties of the composition.

2. It shall not by itself form a homogeneous colloidal mixture with the resin in the temperature range 200°–350° F. when the proportions of oil and resin are 25 to 75 parts by weight.

What is claimed as new and desired to secure by Letters Patent of the United States is:

An electrical insulation consisting of non-rigid non-flame-supporting thermoplastic polyvinyl chloride composition in which the plasticizer is a mixture of (a) hydrocarbon products of a condensation reaction between formaldehyde and an aromatic petroleum fraction having an A. S. T. M. boiling range of about 400° F. to about 500° F. and containing from 30 to 65% aromatic hydrocarbons, said reaction catalysed by such catalysts as hydrogen fluoride, the usual catalysts for the "formolite" reaction, or activated clays together with (b) an ester of phthalic acid in which the sum of the carbons in the two ester groups is not less than 12 nor more than 18; said plasticizing mixture to contain from 55% to 75% by weight of plasticizer mixture of herein described hydrocarbons and the balance of plasticizer mixture is esters of phthalic acid also herein described; which non-rigid non-flame-supporting thermoplastic polyvinyl chloride composition has at 80° C. a D. C. insulation megohm K/1000 ft., not less than 2, contains substantially 80% of weight of resin of plasticizer mixture, and contains substantially 45 parts by weight polyvinyl chloride.

WALLACE BENTLEY MacKENZIE.

REFERENCES CITED

The following references are of record in the file of this patent:

FOREIGN PATENTS

| Number | Country | Date |
|---|---|---|
| 562,956 | Great Britain | July 24, 1944 |